United States Patent [19]

Ammann et al.

[11] 3,714,403

[45] Jan. 30, 1973

[54] COMPUTER IMPLEMENTED METHOD OF DETECTING AND ISOLATING ELECTRICAL FAULTS IN CORE MEMORY SYSTEMS

[75] Inventors: Robert W. Ammann, Lisle; James R. Creasy, Lombard; David O. Dorenbos, Park Ridge, all of Ill.

[73] Assignee: GTE Automatic Electric Laboratories Incorporated, Northlake, Ill.

[22] Filed: Sept. 1, 1971

[21] Appl. No.: 176,956

[52] U.S. Cl. ........................235/153 AC, 324/73 AT

[51] Int. Cl. ..........................G11c 29/00, G06f 11/00

[58] Field of Search ........235/153; 444/1; 340/172.5; 324/73 AT

[56] References Cited

UNITED STATES PATENTS

| | | | |
|---|---|---|---|
| 3,497,685 | 2/1970 | Stafford et al. | 235/153 |
| 3,631,229 | 12/1971 | Bens et al. | 235/153 |
| 3,633,174 | 1/1972 | Griffin | 235/153 |
| 3,659,088 | 4/1972 | Boisvert | 235/153 |

*Primary Examiner*—Charles E. Atkinson
*Attorney*—K. Mullerheim et al.

[57] ABSTRACT

A computer implemented method of detecting and isolating both permanent and intermittent electrical failures in core memory systems is based upon a unique code number associated with each potential failure and derived from the symmetry of the relationship among the memory components for any selected word. The address of each failing memory word is decoded and all of the decoded address fields are OR'ed, on a bit by bit basis to provide a code number indicative of a combination of word failures which is correlated to the specific component failure.

5 Claims, 2 Drawing Figures

INVENTORS
ROBERT W. AMMANN
JAMES R. CREASY
DAVID O. DORENBOS

BY Robert Van Epps
ATTORNEY

COMPUTER IMPLEMENTED METHOD OF DETECTING AND ISOLATING ELECTRICAL FAULTS IN CORE MEMORY SYSTEMS

BACKGROUND OF THE INVENTION

1. Field of the Invention

The present invention relates generally to the field of digital data processing and more particularly to a computer implemented method for detecting and isolating electrical faults in core memory systems.

2. Description of the Prior Art

Prior to the present invention a method including a program for testing selection matrices was disclosed in copending U.S. patent application, Ser. No. 34,912, now U.S. Pat. No. 3,618,030 of James R. Creasy and a method of detecting and isolating shorted selection diodes in core memory systems was disclosed in the copending U.S. patent application, Ser. No. 152,644 of James R. Creasy et al. both of which are assigned to the assignee of the present application. Although the methods set forth in these applications have proven satisfactory in actual use, their utility is greatest in detecting and isolating electrical faults which are of a permanent nature. For example, if a particular selection diode is open, a fixed test sequence will always indicate a prescribed failure symptom regardless of the number of times the test is performed. As is well known in the art, however, the components of a core memory system can, and very often do, fail on an intermittent basis. Thus, not only may an intermittent fault produce an undefined rate of failure in sequential testing, but may not occur at all during a diagnostic test.

OBJECTS AND SUMMARY OF THE INVENTION

From the foregoing it will be understood that among the various objectives of the present invention are:

the provision of a method of operating a digital computer to detect and isolate electrical faults in a core memory system;

to provide a method of the above described character for detecting and isolating intermittent memory faults; and the provision of a method of the above-described character having a high probability of detecting and isolating intermittent faults which have a low probability of occurrence.

These and other objectives of the present invention are efficiently achieved by writing a preselected pattern into all words of the memory and sequentially reading each word and comparing it with what was written; a discrepancy indicating that the word has failed. The address of each failing word is decoded and all of the decoded address fields are then OR'ed on a bit by bit basis to derive a number which is unique for each specific component failure which may occur. This derived number may then be located in a stored correlation table to identify the location of the faulty component.

The foregoing as well as other objects, features and advantages of the present invention will become more apparent from the following detailed description taken in conjunction with the appended drawings.

DESCRIPTION OF THE PREFERRED EMBODIMENT

Figure 1:
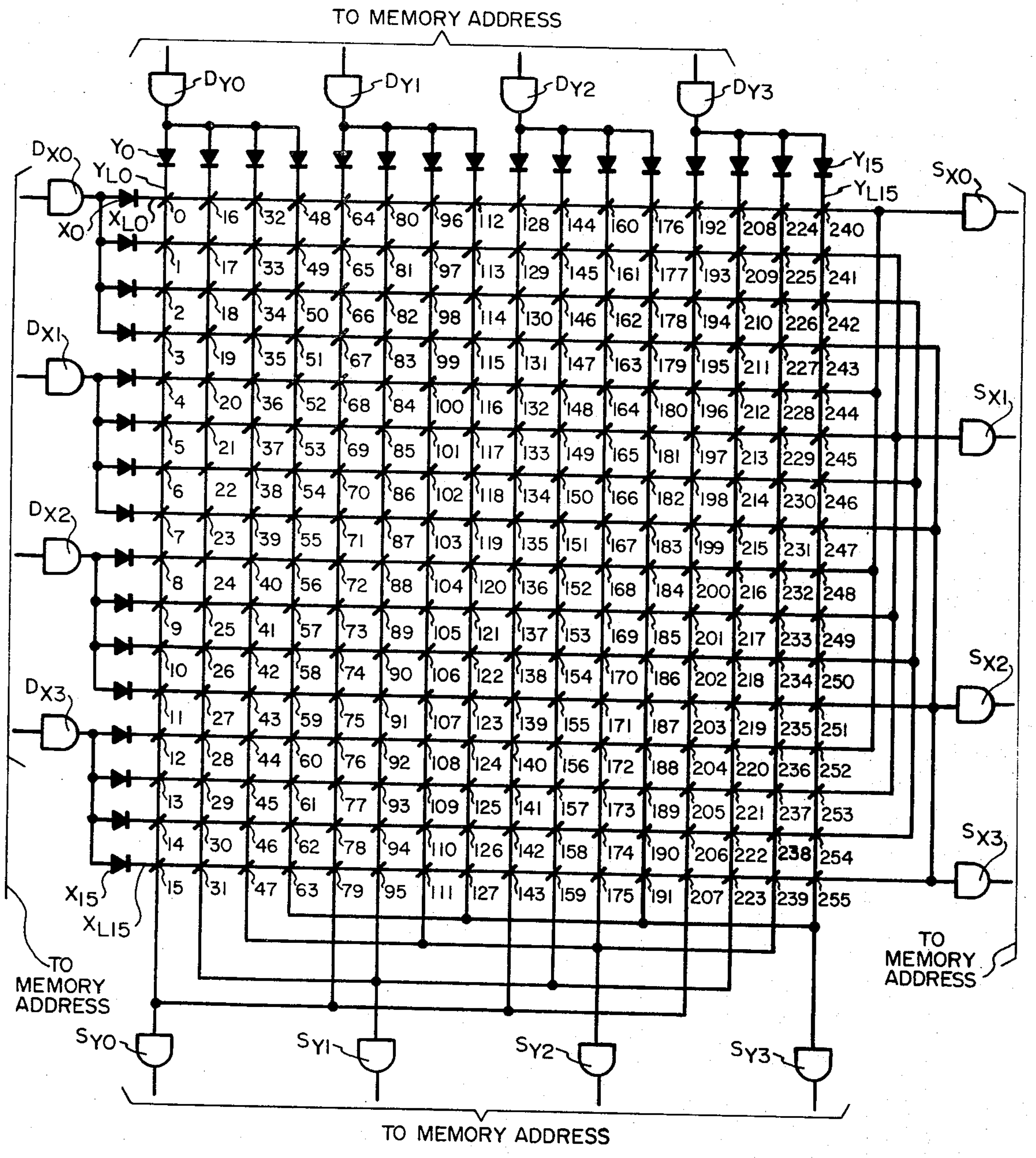
FIG. 1 is a schematic diagram of one plane of a typical 3D core memory arrangement amenable to diagnostic testing through the practice of the present invention.

Although the method of the present invention is applicable to the testing of both 3D and 2½D core memories, for the purposes of illustration reference will be made herein to a 3D memory. One plane of such a memory is schematically illustrated in FIG. 1. It will further be presumed that the memory selection matrix is of the constant current type, however, it is to be understood that the method of this invention is also applicable to constant voltage as well as hybrid constant-current-constant voltage driving schemes.

FIG. 1 is illustrative of one plane of a typical 256 word memory and includes $x$-drivers $D_{X0}$, $D_{X1}$, $D_{X2}$ and $D_{X3}$; $x$-switches $S_{X0}$, $S_{X1}$, $S_{X2}$ and $S_{X3}$; $y$-drivers $D_{Y0}$, $D_{Y1}$, $D_{Y2}$ and $D_{Y3}$; and $y$-switches $S_{Y0}$, $S_{Y1}$, $S_{Y2}$ and $S_{Y3}$. Each driver is coupled via selection diodes $X_{0\text{-}15}$ and core lines $X_{L0\text{-}15}$and $Y_{L0\text{-}15}$ to associated switches respectively. Each drive line is laced through magnetic cores 0–255 in the conventional manner. The memory will in operation be coupled to suitable registers and addressing circuitry as well as operational circuitry of a central processer all of which are well known to those in the electronic data processing art and are not shown. The half-select currents will be provided by $x$ and $y$ constant current generators (not shown) in the conventional manner. Finally the write circuitry is not shown since it is identical to the read circuitry indicated in FIG. 1 and either a read or write component failure will exhibit the identical failure symptom. Thus any fault will always be assumed to be in pairs.

In a memory system of the illustrated size, eight address bits are sufficient to allow any one of the 256 words to be written or read. Two of the address bits, $2^0$ and $2^1$ are decoded for the $x$-switches, and two address bits, $2^2$ and $2^3$ are decoded for the $x$-drivers. In like manner the higher order address bits $2^4$ and $2^5$ are decoded for $y$-switches and $2^6$ and $2^7$ for $y$-drivers. Thus, every word of memory is directly related to the 16 gates obtained by decoding eight address bits. These 16 gates have a one-to-one relationship with the $x$ and $y$ drivers and switches. The four by four driver-switch matrix further is seen to require 16 diodes. As is well known there is a direct relationship for any selected word between the address register, decoded address gates, switches, drivers and selection diodes. What has not been previously recognized however is the symmetry of this relationship in conjunction with a constant current method of driving the core lines which permits all single circuitry faults, whether permanent or intermittent, to be uniquely identified by a code number. This code number may be derived from the faulty memory by decoding the address of every word of memory that fails and then OR'ing all of these decoded address fields on a per-bit basis.

By way of example, assuming $x$-selection diode $X_0$ is a permanent open fault, whenever $x$-driver $D_{X0}$ and $x$-switch $S_{X0}$ are selected, regardless of the $y$-line driver switch combination selected, the core word will fail. Thus sixteen words of memory will fail and will have the following word addresses and decoded address fields:

| Address 76543210 22222222 | Y-drivers 3210 | Decoded Address Y-switches 3210 | X-drivers 3210 | X-switches 3210 | Word Failure |
|---|---|---|---|---|---|
| 00000000 | 0001 | 0001 | 0001 | 0001 | 0 |
| 00010000 | 0001 | 0010 | 0001 | 0001 | 16 |
| 00100000 | 0001 | 0100 | 0001 | 0001 | 32 |
| 00110000 | 0001 | 1000 | 0001 | 0001 | 48 |
| 01000000 | 0010 | 0001 | 0001 | 0001 | 64 |
| 01010000 | 0010 | 0010 | 0001 | 0001 | 80 |
| 01100000 | 0010 | 0100 | 0001 | 0001 | 96 |
| 01110000 | 0010 | 1000 | 0001 | 0001 | 112 |
| 10000000 | 0100 | 0001 | 0001 | 0001 | 128 |
| 10010000 | 0100 | 0010 | 0001 | 0001 | 144 |
| 10100000 | 0100 | 0100 | 0001 | 0001 | 160 |
| 10110000 | 0100 | 1000 | 0001 | 0001 | 176 |
| 11000000 | 1000 | 0001 | 0001 | 0001 | 192 |
| 11010000 | 1000 | 0010 | 0001 | 0001 | 208 |
| 11100000 | 1000 | 0100 | 0001 | 0001 | 224 |
| 11110000 | 1000 | 1000 | 0001 | 0001 | 240 |

By OR'ing this decoded address field the following number is derived:

A = 1111 1111 0001 0001

If this procedure is repeated for each of the other sixteen $x$-selection diodes being open, a different number would be derived. The derived number is unique to a given faulty component and will not occur again for any other fault such as a shorted switch, open driver, etc.

The identical number will be derived if a select group of four words fail rather than all 16 words. Again, assuming that $x$-selection diode $X_0$ is an intermittent open fault such that only four words fail, e.g., words 0, 80, 160 and 240, the four word addresses and decoded address are:

| Address 76543210 22222222 | Y-drivers 3210 | Decoded Address Y-switches 3210 | drivers 3210 | X-switches 3210 | Word Failure |
|---|---|---|---|---|---|
| 00000000 | 0001 | 0001 | 0001 | 0001 | 0 |
| 01010000 | 0010 | 0010 | 0001 | 0001 | 80 |
| 10100000 | 0100 | 0100 | 0001 | 0001 | 160 |
| 11110000 | 1000 | 1000 | 0001 | 0001 | 240 |

The "OR"ing of this decoded address field gives a number,

B = 1111 1111 0001 0001 = A

Thus the code number indicative of an open $x$-selection diode $X_0$ may be defined if as few as four words fail. There are of course other combinations of words; e.g., 16, 64, 176 and 224, which may fail and lead to the derivation of the same code number.

The method of the present invention will also provide the detection and isolation of an intermittent shorted driver. Assuming $x$-driver $D_{X0}$ to be a permanent short, whenever that driver is selected with any switch, no error will occur, however, each time another $x$-driver is selected, the current will divide equally between $x$-driver $D_{X0}$ and the selected X-driver. This 50 per cent reduction in current in the selected line will cause a word failure and 192 of the 256 words of memory will fail. Assuming now that the $x$-driver $D_{X0}$ is an intermittent short and only four words; e.g., 4, 89, 174 and 255, fail, the four word addresses and decoded addresses are:

| Address 76543210 22222222 | Y-drivers 3210 | Decoded Address Y-switches 3210 | X-drivers 3210 | X-switches 3210 | Word Failure |
|---|---|---|---|---|---|
| 00000100 | 0001 | 0001 | 0010 | 0001 | 4 |
| 01011001 | 0010 | 0010 | 0100 | 0010 | 89 |
| 10101110 | 0100 | 0100 | 1000 | 0100 | 174 |
| 11111111 | 1000 | 1000 | 1000 | 1000 | 255 |

The OR'ing of this decoded address field gives a number,

C = 1111 1111 1110 1111

Regardless of how many more failures associated with $x$-driver $D_{X0}$ occur the derived number, C, will not change. There are of course many more combinations of four word failures; e.g. 21, 106, 191 and 204, which will yield the same fault code number. It will be noted that the fault code number is the same regardless of whether the fault is permanent and all 192 words fail or intermittent and a specific combination of as few as four words fail.

From the foregoing it will be apparent that a unique fault code number may be derived for various combinations of four word failures for each of the potential faults in the memory. The fault code number for each such fault remains the same for a permanent fault which fails many words and an intermittent fault which fails a minimum of four words. There are thus unique fault code numbers which may be derived for each of the following faults:

| | |
|---|---|
| 1) shorted $x$-driver | 7) open $x$-switch |
| 2) shorted $y$-driver | 8) open $y$-switch |
| 3) open $x$-driver | 9) shorted $x$-selection diode |
| 4) open $y$-driver | 10) shorted $Y$-selection diode |
| 5) shorted $x$-switch | 11) open $x$-selection diode |
| 6) shorted $y$-switch | 12) open $y$-selection diode |

13) address bit stuck at one or zero

It will be further noted that an open or shorted decoding gate will exhibit the same failure symptoms as an open or shorted driver or switch.

As set forth above the fault code number derived for shorted $x$-driver $D_{X0}$ was the 16 bit pattern, C = 1111 1111 1110 1111. Since this pattern is derived by OR'ing the decoded address for every word failure, the word failures necessary to obtain the code number are:

1. at least one word fails on each of the other three $x$-drivers,
2. at least one word fails on each of the four $x$-switches,
3. at least one word fails on each of the four $y$-drivers,
4. at least one word fails on each of the four $y$-switches.

These failures are indicated by a minimum of four words:

Word 1 = $(D_{Y0} \cdot (S_{Y0}+S_{Y1}+S_{Y2}+S_{Y3}))\cdot((D_{X1}+D_{X2}+D_{X3})\cdot(S_{X0}+S_{X1}+S_{X2}+S_{X3}))$ Word 2 = $(D_{Y1}\cdot(S_{Y0}+S_{Y1}+S_{Y2}+S_{Y3}))\cdot((D_{X1}+D_{X2}+D_{X3})\cdot(S_{X0}+S_{X1}+S_{X2}+S_{X3}))$ Word 3 = $(D_{Y2}\cdot(S_{Y0}+S_{Y1}+S_{Y2}+S_{Y3}))\cdot((D_{X1}+D_{X2}+D_{X3})\cdot(S_{X0}+S_{X1}+S_{X2}+.X3))$ $$\text{Word } 4 = (D_{Y3}\cdot(S_{Y0}+S_{Y1}+S_{Y2}+S_{Y3}))\cdot((D_{X1}+D_{X2}+D_{X3})\cdot(S_{X0}+S_{X1}+S_{X2}+S_{X3}))$$

It will be noted that if word 1 is selected such that $S_{Y0}$ is used, then word 2 may only involve one of three switches ($S_{Y1}$, $S_{Y2}$ or $S_{Y3}$). Word 3 must be one of two, etc. thus there are N! combinations of *y*-switches; N being the number of *y*-switches (in the illustrated example N = 4). The same applies to the *x*-switches. For drivers, however, another factor is required. Assuming word 1 is selected and driver $D_{X1}$ is used, then word 2 is one of two and word 3 takes the remaining *x*-driver. This gives a combination of $(N-1)!$, however, word 4 is satisfied using any *x*-driver. Thus the additional factor necessary for the drivers is:

$$(N-1)\ N/2=(N/2)$$

and the total combination of selected four word failures satisfying the fault code number is:

$$(N!)(N!)(N-1)!([N!/(N-2)!2!])=20{,}736$$

There are thus 20,736 possible combinations of four word failures which will produce the fault code number associated with a given shorted driver or switch. In the same manner it may be shown that the total combinations of selected four word failures corresponding to particular fault types are:

| Fault | Total Combinations |
|---|---|
| shorted driver | 20,736 |
| shorted switch | 20,736 |
| shorted diode | 52,704 |
| open driver | 576 |
| open switch | 576 |
| open diode | 24 |

Thus it will be understood that there are many four word failure combinations associated with any one particular fault, any one of which will give the correct fault code number through the practice of the method of this invention.

By expanding upon the foregoing it may be demonstrated that a 4K memory organized similarly to the smaller one illustrated in FIG. 1 would have a very large number of combinations any one of which describes the particular fault code number correctly. In the larger memory, however, each combination would consist of eight words rather than four since eight drivers and eight switches would be required for half select and $N = 8$. The total number of word combinations for a shorted switch would therefore be:

$$(N!)(N!)(N-1)!([N!/(N-bu2)!2!]) \cong 2\times 10^{14}$$

Since there are so many possible combinations for each fault type, particularly for the shorted driver, switch or diode, the probability of obtaining the correct fault code number for a particular fault is very high even for those faults having a relatively low probability of occurrence.

Figure 2:
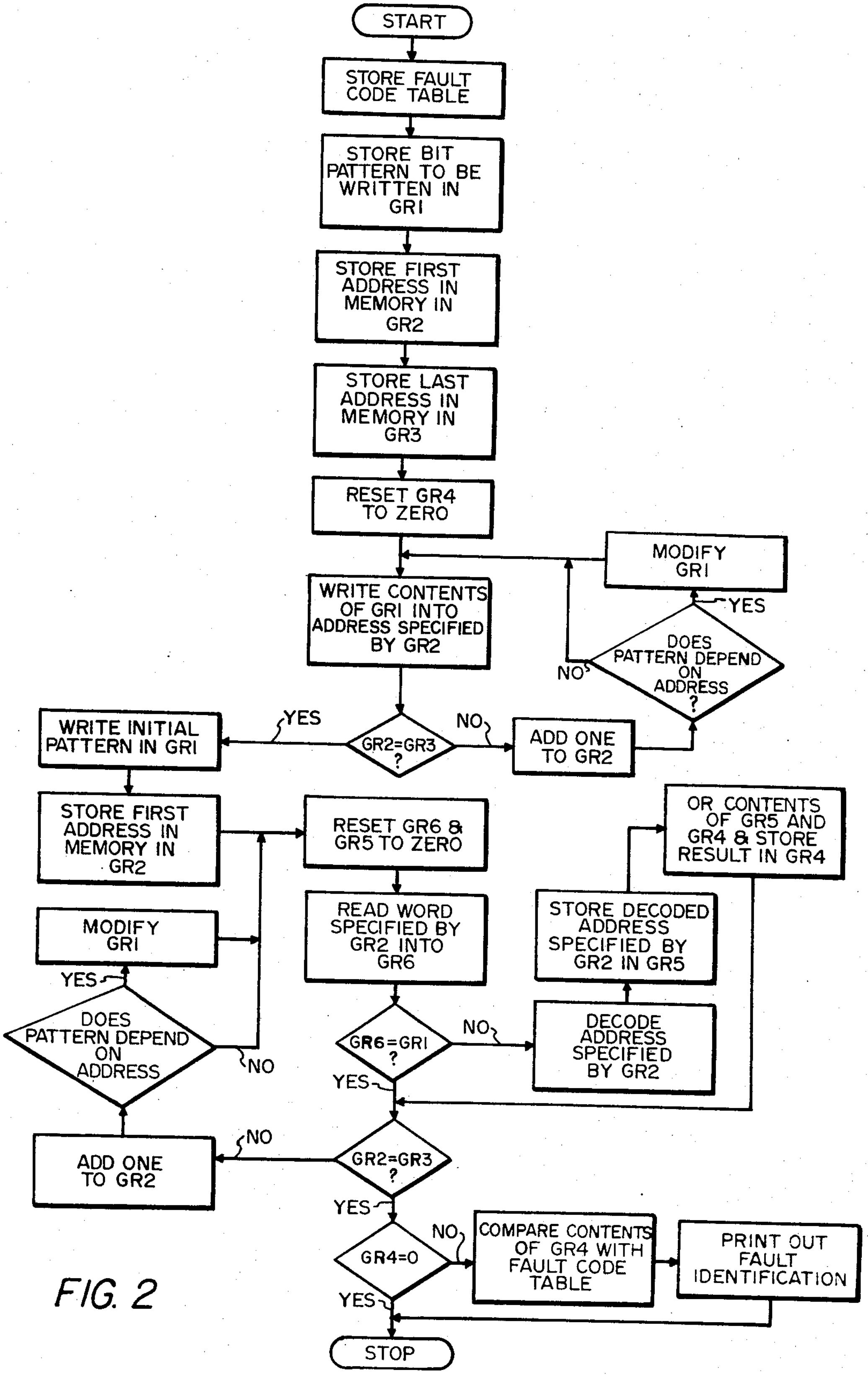
FIG. 2 is a flow chart of a test procedure in accordance with the method of the present invention.

The method of the present invention is, of course, intended for implementation on a digital computer having appropriate addressing and register circuitry in addition to the standard operational circuits. FIG. 2 thus illustrates a flow chart of the computer implemented method of this invention. For the purposes of illustration of computer register space may be considered to be divided into six general register sections herein termed GR1 through GR6. A fault code table including all possible fault code numbers correlated with the fault to which each is uniquely related may also be stored in any available memory space. GR1 contains the pattern to be written into the memory. It is preferred that the pattern used is the address of each word in the memory such that a unique pattern is written into each word. The method, however, may employ any desired pattern whether unique to each word or not and in a simplest form, for example, could be all ones or zeros for all words. GR2 initially contains the first address in the memory and is stepped to successive addresses as the method is executed. GR3 contains the last address in the memory. GR4 is the register in which decoded addresses are stored on detection of a word failure during execution of the method. GR5 is an interim register for storing the decoded addresses of failing words prior to OR'ing the decoded addresses with the decoded addresses of all words which had previously failed. Finally, GR6 receives the memory word content.

On starting the method a fault code table is stored, a selected bit pattern for the memory is stored in GR1, the first and last addresses in the memory are stored in GR2 and GR3 respectively and GR4 is set to zero. The contents of GR1 are then written into the first address specified by GR2. This writing step is repeated for each address in the memory, one being added to GR2 on each repetition of the step. If, as is preferred, a unique pattern is to be written into each address, the contents of GR1 are also appropriately modified at each repetition of the writing step. If a uniform pattern is used for all addresses the pattern is not dependent upon the address and no such modification is required. When the writing step is complete the contents of GR2 and GR3 become equal and the reading portion of the method is begun. At this point the initial pattern written into the first memory address is written into GR1, the first address in the memory is stored in GR3 and GR4 and GR5 are set to zero. The contents of the address specified by GR2 are then read into GR6 and compared with the pattern which was originally written at that address and which is stored in GR1. If there is an equality of the contents of GR6 and GR1 there has not been a word failure and the reading cycle continues until the contents of GR2 equal GR3 indicating the completion of the test procedure. If GR2 does not equal GR3, one is added to GR2 and reading is continued. As discussed above, if a unique pattern is used for each address the contents of GR1 must be appropriately modified; if a uniform pattern is used no modification is required prior to reading the next word.

If the word read into GR6 does not equal that stored in GR1 there has been a word failure. In this case the address contained in GR2 is decoded and stored in GR5. The contents of GR4 and GR5 are then OR'ed and the result is stored in GR4. The reading step is then continued until all addresses have been read. At this point GR4 will contain the results of OR'ing the decoded addresses of each word in the memory that has failed. If no word failures have occurred the contents of GR4 are zero, the method is completed and the computer stopped. If the contents of GR4 are not zero the contents are compared with the stored fault code table to correlate the contents of GR4 with a corresponding electrical fault. The fault identification may then be printed out and the computer stopped. Alternatively, the contents of GR4 may simply be printed out and manual correlation with a fault table used to identify the faulty component.

It should be noted that if the central processor of a given computer system includes provisions for error detection and has register space available for relatively long term data storage the method of the present invention may be implemented without the running of a complete diagnostic test. If, each time a memory word is detected as an error, the address of that word is decoded, OR'ed with all previously decoded addresses and the results stored. Accumulation of these errors over a period of time may complete a combination of word failures required to isolate even very rarely occurring intermittent memory faults.

From the foregoing it will be seen that the Applicants have provided a new and novel computer implemented method of detecting nd isolating intermittent as well as permanent electrical faults in computer memory systems whereby the objectives set forth hereinabove are efficiently achieved. Since certain changes in the above described method will occur to those skilled in the art without departure from the scope of the invention it is intended that all matter contained in the description as shown in the drawings shall be interpreted as illustrative and not in a limiting sense.

Having described what is new and novel and desired to secure by Letters Patent, what is claimed is:

1. A computer implemented method of detecting and isolating electrical faults in a core memory system comprising the steps of writing a preselected bit pattern into each word of said memory, reading each word in said memory, comparing each word read with said preselected pattern written into that word to thereby detect failing words through inequality of said word read with said word written, decoding the address of each said failing word, OR'ing the decoded addresses of all failing words in said memory to thereby generate a fault code number which is uniquely related to the electrical fault in said core memory system.

2. The method recited in claim 1 wherein said preselected bit pattern is uniquely different for each word of said memory.

3. The method recited in claim 2 wherein said unique bit pattern is the address of each word of said memory.

4. The method recited in claim 1 wherein said preselected bit pattern is common to all words of said memory.

5. The method recited in claim 1 further including the steps of storing a fault code table which uniquely correlates each possible fault code number with the electrical fault identified thereby, comparing the result of OR'ing said decoded addresses of all said failing words with said fault code table to uniquely identify said electrical fault, and displaying the identification of said electrical fault.

* * * * *